United States Patent Office 3,767,729
Patented Oct. 23, 1973

3,767,729
BENZYLIDENE SORBITOLS AS UNSATURATED
POLYESTER COMPOSITION THICKENERS
Koichi Murai, Kyoto, Yasuo Choshi, Uji, and Toshiaki Kobayashi, Kyoto, Japan, assignors to New Japan Chemical Company, Limited, Kyoto-shi, Japan, a juridical person of Japan
No Drawing. Filed Feb. 14, 1972, Ser. No. 226,276
Claims priority, application Japan, Feb. 16, 1971,
46/7,282
Int. Cl. C08f 43/02
U.S. Cl. 260—861     7 Claims

ABSTRACT OF THE DISCLOSURE

In producing a shaped product of an unsaturated polyester resin by shaping a composition of an unsaturated polyester dissolved in a vinyl monomer and curing the shaped composition, a method which is characterized in that at least one of mono-, di- and tri-benzylidene sorbitols is added to said composition in a concentration of 0.3 to 10 weight percent.

---

This invention relates to a method for producing shaped products of unsaturated polyester resins.

Unsaturated polyester resins have extensively been used in various fields in the form of shaped products, such as, flat plates, corrugated plates, bathtubs, purification tanks, receptacles for chemicals, pipes, etc. According to the known method for producing such shaped products an unsaturated polyester resin composition prepared by dissolving an unsaturated polyester in a vinyl monomer is shaped and cured to produce shaped products of unsaturated polyester resins. The problems encountered in the known methods are that during the shaping and curing procedures the outflow of the unsaturated polyester resin composition is liable to occur and that when the resin composition is applied onto a vertical surface for lining, the running of the resin is also unavoidable, resulting in the production of shaped products having resin layer of uneven thickness with mechanical strengths lowered.

Therefore, it has been proposed to impart thixotropy to unsaturated polyester resin compositions by adding thereto antisag agents such as "Aerosil" (trademark, colloidal silica of Japan Aerosil K.K.), organic betonite, etc. However, these agents fail to effectively prevent the outflow or running of the resin since the effect thereof is markedly reduced by heat applied in the curing step. As far as the applicant is aware no successful method has yet been proposed.

An object of the invention is to provide an unsaturated polyester resin composition having excellent thixotropic properties even at elevated temperatures as well as at room temperatures.

A further object of the invention is to provide a method capable of producing shaped products of unsaturated polyester resins free from undesired outflow or running of the resins even when heat is applied in the curing step.

According to the method of the invention, in producing a shaped product of an unsaturated polyester resin by shaping a composition of an unsaturated polyester dissolved in a vinyl monomer and curing the shaped composition, at least one of mono, di- and tri-benzylidene sorbitols is added to said composition in a concentration of 0.3 to 10 weight percent.

The researches of the present inventors have revealed that when a benzylidene sorbitol is added to an unsaturated polyester resin composition excellent thioxtropic property is imparted to the composition without any adverse effect on shaping property thereof and the resultant composition exhibits no outflow or running during shaping and curing procedures even when heat is applied thereto. Particularly, when the composition containing a benzylidene sorbitol is heated the viscosity thereof is rather increased to marked extent, completely preventing undesired outflow or running thereof during shaping and curing procedures. Thus, according to the present invention, it is possible to produce shaped products of unsaturated polyester resins having uniform thickness through the entire parts of the products without any decrease of mechanical strengths.

The unsaturated polyester resin composition used in the invention is well known in the art and prepared by dissolving unsaturated polyester in a vinyl monomer. As known in the art, the unsaturated polyester is produced by a condensation reaction of polyhydric alcohols with $\alpha,\beta$-unsaturated polybasic acids or with a mixture of $\alpha,\beta$-unsaturated polybasic acids and other polybasic acids. Examples of the $\alpha,\beta$-unsaturated polybasic acids are maleic acid, maleic anhydride, fumaric acid, itaconic acid, etc. Other polybasic acids used in combination with the $\alpha,\beta$-unsaturated polybasic acids include, for example, phthalic acid, halogenated phthalic acid, methyl-3,6-endomethylene-$\Delta^4$-tetrahydrophthalic acid, terephthalic acid, tetrahydrophthalic acid, hexahydrophthalic acid, succinic acid and anhydrides of these acids. Examples of polyhydric alcohols are ethylene glycol, propylene glycol, diethylene glycol, dipropylene glycol, triethylene glycol, neopentyl glycol, hydrogenated bisphenol-A, pentaerythritol, glycerine, soribtol, etc.

The vinyl monomers in which the unsaturated polyester is dissolved are those capable of polymerizing with the unsaturated polyester and include, for example, styrene, vinyl toluene, esters of acrylic acid, esters of methacrylic acid, vinyl acetate, diallyl phthalate, etc. Of these styrene in the most preferable.

According to the present invention it is essential to add a benzylidene sorbitol to the unsaturated polyester resin composition. The benzylidene sorbitols used in the invention are known in the art and can be prepared by reacting benzaldehyde with sorbitol in the presence of acidic catalysts. By adjusting the molar ratio of benzaldehyde to sorbitol mono-benzylidene sorbitol, dibenzylidene sorbitol and tribenzylidene sorbitol can be produced selectively. In the invention all of these benzylidene sorbitols can be used alone or in admixture with one another. Therefore, when the mixture of benzylidene sorbitols is produced, there is no need to isolate them. Preferred in the invention are dibenzylidene sorbitol, a mixture of monobenzylidene sorbitol and dibenzylidene sorbitol or a mixture of dibenzylidene sorbitol and tribenzylidene sorbitol. The amount of the benzylidene sorbitol added to the unsaturated polyester resin composition is usually in the range of 0.3 to 10 weight percent, preferably 0.5 to 5 weight percent. The addition of benzylidene sorbitol gives no adverse effect on the shaping property of the composition nor reduce the mechanical strengths of the resultant shaped products.

In adding the benzylidene sorbitol to the unsaturated polyester resin composition it is preferable to first disperse or dissolve the benzylidene sorbitol in the vinyl monomer at a room temperature or at an elevated temperature and then to knead the mixture with the unsaturated polyester or with a mixture of unsaturated polyester and vinyl monomer. Alternatively the benzylidene sorbitol may first be dispersed in unsaturated polyester and then mixed with vinyl monomer. It is also possible to directly add the benzylidene sorbitol to a mixture of unsaturated polyester resin and vinyl monomer. In another method, the benzylidene sorbitol is first dispersed or dissolved in a volatile solvent such as carbon tetrachloride, etc. or in plasticizers for polyvinyl chloride, such as tricresyl phosphate, phthalate type plasticizers, etc., and thereafter mixed with a mixture of unsaturated polyester and vinyl monomer.

To the unsaturated polyester resin composition there can be added catalysts, fillers, pigments and other known additives in accordance with the conventional manner. Typical examples of the catalysts are organic peroxides, such as benzoyl peroxide, methylethyl ketone peroxide, lauroyl peroxide, etc.

Various shaping methods known in the art are applicable in the invention. For example, hand layup method, sprayup method, cold press method, bag method, matched die method, filament winding method, continuous molding method and like known methods can be applied in the invention.

For a better understanding of the invention examples are given below, in which parts and percentages are all by weight.

EXAMPLE 1

35.0 g. of 70% aqueous solution or sorbitol, 35.6 g. of benzaldehyde and 526 ml. of cyclohexane were mixed in a nitrogen gas stream, to which 0.4 g. of 60% surfuric acid was slowly added. The resultant mixture was heated at 80–83° C. for 7 hours, while removing water produced by the reaction as an azeotropic mixture with cyclohexane. After being cooled to room temperature the reaction mixture was neutralized with alkali, washed with water and filtrated. The residue was further washed with warm water several times, whereby 48 g. of benzylidene sorbitol was obtained in the form of white powder. The product was found to have an acetal value of 348.5 and to be a mixture of dibenzylidene sorbitol and tribenzylidene sorbitol in an approximate molar ratio of 1:1.

The resultant benzylidene sorbitol was dispersed in styrene to produce a dispersion having a concentration of 5%.

On the other hand, in 25 g. of styrene was dissolved 75 g. of unsaturated polyester prepared from 50 parts of maleic anhydride, 74 parts of phthalic anhydride and 66 parts of ethylene glycol. The unsaturated polyester used had an average molecular weight of 2,000.

25 g. of the 5% benzylidene sorbitol dispersion prepared before was mixed with the above polyester solution to produce unsaturated polyester resin composition having the following properties:

Viscosity at 22° C.: 299 cps.
Thixotropic index at 22° C.: 1.2 wherein viscosity was measured by Brookfield viscometer and thixotropic index was determined in accordance with JIS (Japanese Industrial Standard) K6901.

When the viscosity and thixotropic index of the composition were measured at 70° C. they increased to 1304 cps. and to 4.6 respectively. Thus it is evident that the composition exhibited a higher order of thixotropic property at elevated temperature.

To the composition were added 1% of benzoyl peroxide and 0.2% of dimethylaniline. The mixture was poured into an iron dish and heated at 80° C. for 10 minutes. Thereafter the dish was inclined 30° and heated at 160° C. for 2 hours to cure the mixture. The cured product taken out from the dish was found to have uniform thickness in every portion thereof.

The resultant shaped product had the properties shown in Table 1 below, in which are also shown as contrast those of shaped product prepared in the same manner as above except that benzylidene sorbitol was not used and the curing was conducted with the dish kept horizontally.

TABLE 1

| Properties | Shaped products | |
|---|---|---|
| | Example 1 | Contrast |
| Rockwell hardness | 105 | 100 |
| Tensile strength (kg./mm.²) | 5.0 | 5.0 |
| Elongation (percent) | 7.0 | 6.9 |
| Heat distortion value (° C.) | 60 | 60 |

Note.—The physical properties shown in Table 1 and hereinafter disclosed were determined in accordance with the following methods:

Rockwell hardness: ASTM D–638
Tensile strength: ASTM D–638
Elongation: ASTM D–638
Heat distortion value: ASTM D–648

EXAMPLE 2

Four kinds of unsaturated polyester resin compositions were prepared in the same manner as in Example 1, in which the amounts of unsaturated polyester, styrene and benzylidene sorbitol were varied as shown in Table 2 below and mono-, di- or tri-benzylidene sorbitol was used alone. The viscosities of the respective compositions were measured at 22° C. and 70° C. with the results shown in Table 2 below, in which is also shown as contrast the viscosity of the composition prepared in the same manner as above except that benzylidene sorbitol was not used.

TABLE 2

| | Amount (wt. part) | | | | Viscosity (cps.) at— | |
|---|---|---|---|---|---|---|
| | Poly-ester | Sty-rene | Benzylidene sorbitol | | | |
| | | | Kind | Amount | 22° C. | 70° C. |
| Composition No.: | | | | | | |
| 1 | 65 | 32.33 | MBS | 0.97 | 328 | 442 |
| 2 | 70 | 45.55 | TBS | 1.15 | 286 | 712 |
| 3 | 80 | 51.98 | DBS | 1.32 | 316 | 722 |
| 4 | 90 | 58.51 | DBS | 1.49 | 317 | 500 |
| Contrast | 70 | 47.00 | | 0 | 147 | 32 |

Note.—
MBS: Monobenzylidene sorbitol
DBS: Dibenzylidene sorbitol
TBS: Tribenzylidene sorbitol From Table 2 above it is seen that the addition of benzylidene sorbitol results in the increase of viscosity of the composition to such an extent that the shaping property of the composition is still retained and that when the composition is heated the viscosity thereof is further increased, so that outflow or running of the composition can not occur by heat applied in curing step.

To each composition were added 1.0% of benzoyl peroxide and 0.2% of dimethylaniline and the mixture was cured in a mold at 60° C. for 1 hour and then at 160° C. for 1 hour.

The properties of the resultant shaped products are shown in Table 3 below.

TABLE 3

| Properties | Composition number | | | | Contrast |
|---|---|---|---|---|---|
| | 1 | 2 | 3 | 4 | |
| Rockwell hardness | 100 | 99 | 103 | 100 | 108 |
| Tensile strength (kg./mm.²) | 4.8 | 5.0 | 6.2 | 7.1 | 5.0 |
| Elongation (percent) | 7.5 | 6.7 | 3.5 | 2.0 | 6.1 |
| Heat distortion value (° C.) | 60 | 60 | 75 | 89 | 60 |

Comparison

For comparison four kinds of comparative compositions were prepared in the same manner as in Example 2 except that "Aerosil" (trademark, colloidal silica of Japan Aerosil K.K.) was used in place of the benzylidene sorbitol.

The amounts of the respective components used and the viscosities of the resultant compositions at 22° C. and 70° C. are shown in Table 4 below.

TABLE 4

|  | Amount (wt. part) | | | Viscosity (cps.) at— | |
| --- | --- | --- | --- | --- | --- |
|  | Polyester | Styrene | Aerosil | 22° C. | 70° C. |
| Composition No.: |  |  |  |  |  |
| 5 | 160 | 104.51 | 1.49 | 170 | 31 |
| 6 | 160 | 103.02 | 2.98 | 175 | 38 |
| 7 | 160 | 101.58 | 4.42 | 208 | 48 |
| 8 | 160 | 100.65 | 5.35 | 282 | 56 |
| Contrast | 160 | 106.00 | 0 | 135 | 24 |

Contrary to the present compositions Nos. 1 to 4 before, the comparative compositions Nos. 5 to 8 above showed marked reduction in viscosity when heated.

EXAMPLE 3

In 50 g. of styrene was dissolved 70 g. of unsaturated polyester used in Example 2. The resultant solution was mixed with 10 g. of a solution containing 15% dibenzylidene sorbitol dissolved in tricresyl phosphate. The viscosity of the resultant composition at 20° C. and 70° C. is as follows:

Viscosity at 20° C.: 154 cps.
Viscosity at 70° C.: 800 cps.

To the composition were added 1% of benzoyl peroxide and 0.2% dimethylaniline and the mixture was heated in a mold at 80° C. for 10 minutes and at 160° C. for 2 hours for curing.

The properties of the resultant shaped products are shown in Table 5 below in which are also shown as contrast those of shaped product prepared in the same manner as above except that benzylidene sorbitol was not used.

TABLE 5

| Properties | Shaped products | |
| --- | --- | --- |
|  | Example 3 | Contrast |
| Rockwell hardness | 98 | 98 |
| Tensile strength (kg./mm.²) | 3.8 | 3.3 |
| Elongation (percent) | 8.5 | 8.5 |
| Heat distortion value (° C.) | 70 | 60 |

EXAMPLE 4

To 100 g. of unsaturated polyester resin solution containing 80% of unsaturated polyester and 20% of styrene was added a predetermined amount of dibenzylidene sorbitol, and thereafter 33 g. of styrene was further added to the mixture.

The amount of dibenzylidene sorbitol used and the viscosity of the resultant composition at 70° C. are shown in Table 6, in which are also shown for comparison those of the compositions prepared in the same manner as above except that "Aerosil" (trademark, the same as defined before) was used in place of benzylidene sorbitol.

TABLE 6

|  | Amount of additives (wt. percent) | | Viscosity (cps.) at 70° C. |
| --- | --- | --- | --- |
|  | DBS | Aerosil |  |
| Contrast | 0 | 0 | 40 |
| Composition number: |  |  |  |
| 9 | 1.0 |  | 200 |
| 10 | 2.0 |  | 450 |
| 11 | 3.0 |  | 750 |
| 12 | 5.0 |  | 1,100 |
| 13 | 7.0 |  | 3,000 |
| 14 | 10.0 |  | 10,000 |
| 15 |  | 1.0 | 50 |
| 16 |  | 2.0 | 55 |
| 17 |  | 3.0 | 70 |
| 18 |  | 5.0 | 130 |
| 19 |  | 7.0 | 200 |

EXAMPLE 5

4 parts of dibenzylidene sorbitol was added to 100 parts of "Derakane" (trademark; nonfunctional unsaturated polyester resin composition of Dow Chemical Corp., U.S.A., which comprises 70% of unsaturated polyester and 30% of styrene). The mixture was stirred at 200–250 r.p.m. for 15 minutes to allow the dibenzylidene sorbitol to be dispersed in the composition. 17 hours after the preparation the viscosity and thixotropic index of the resultant composition were measured in the same manner as in Example 1 with the results shown below:

Viscosity at 27° C.: 1840 cps.
Thixotropic index at 27° C.: 2.75

What we claim is:
1. In the method of producing a shaped product of an unsaturated polycarboxylic ester resin by shaping a composition of an unsaturated polycarboxylic acid-polyhydric alcohol polyester dissolved in a vinyl monomer and curing the shaped composition, the improvement which comprises adding at least one of mono-, di- and tri-benzylidene sorbitols to said composition in a concentration of from about 0.3 to about 10 weight percent.

2. The method according to claim 1 in which said benzylidene sorbitol is monobenzylidene sorbitol.

3. The method according to claim 1 in which said benzylidene sorbitol is a mixture of monobenzylidene sorbitol and dibenzylidene sorbitol.

4. The method according to claim 1 in which said benzylidene sorbitol is dibenzylidene sorbitol.

5. The method according to claim 1 in which said benzylidene sorbitol is a mixture of dibenzylidene sorbitol and tribenzylidene sorbitol.

6. The method according to claim 1 in which said benzylidene sorbitol is tribenzylidene sorbitol.

7. The method according to claim 1 in which said concentration of the benzylidene sorbitol is in the range of 0.5 to 5 weight percent.

References Cited
UNITED STATES PATENTS
2,984,643  5/1961  Nischk et al. _____ 260—45.4

OTHER REFERENCES

Chemical Abstracts 74, 64843n (1971); (Hamada et al., Japan 70/22,008).

HAROLD D. ANDERSON, Primary Examiner
EARL A. NIELSEN, Assistant Examiner